Feb. 21, 1928. 1,659,809
W. I. CHIDESTER
PROCESS FOR FREEING CELLULOSE FIBERS FROM VEGETABLE MATERIALS
Filed Jan. 11, 1927
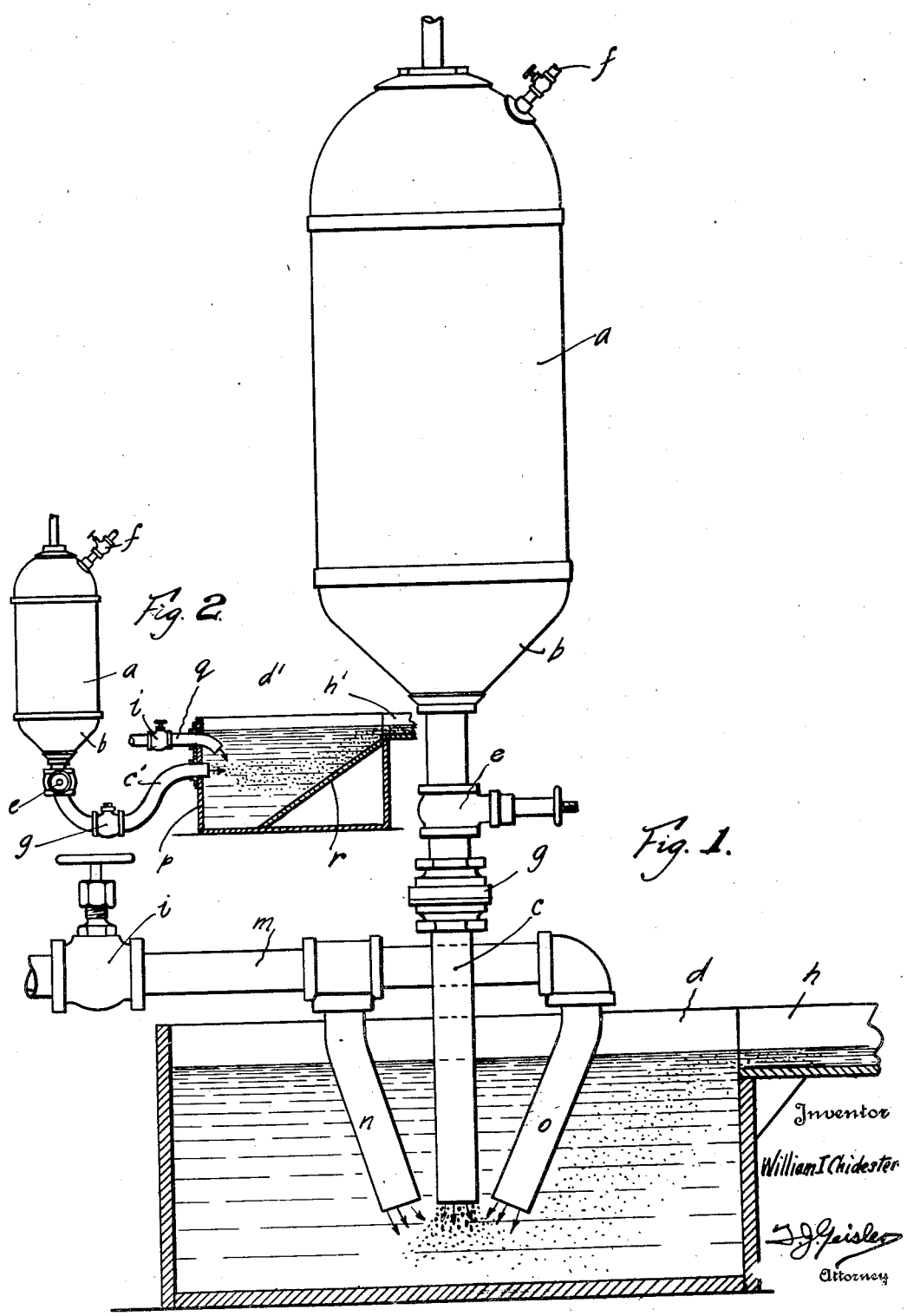

Patented Feb. 21, 1928.

1,659,809

UNITED STATES PATENT OFFICE.

WILLIAM I. CHIDESTER, OF PORTLAND, OREGON.

PROCESS FOR FREEING CELLULOSE FIBERS FROM VEGETABLE MATERIALS.

Application filed January 11, 1927. Serial No. 160,481.

My invention relates to a process for separating the cellulose fibers of wood or other vegetable materials whereby the cellulose therein contained is separated and recovered from the other constituents of the vegetable materials.

As is well known in the art, the wood used for the manufacture of paper is "hogged" or ground, or broken up into relatively small pieces which are commonly called "paper chips." These chips are then subjected to a process known as cooking or digesting. That is, they are cooked in a digester in a liquor capable of dissolving the lignin or resins which accompany the cellulose until the chips become a pulp-like mass.

This mass of cellulose fiber is then washed for a long period of time by agitating it in water, which serves the double purpose of washing away whatever liquid of the digester is retained in the pulp-like mass, and to further separate the cellulose fibers.

The principal object of my invention is to provide a process whereby the cellulose fibers of the various vegetable materials used in the manufacture of paper, and other cellulose products will be rapidly, economically and efficiently separated and recovered from the "cooked" contents of the digester, as it is discharged into an open vessel of liquid, preferably water, whereby the "washing process" well known to those skilled in the art will be largely, if not entirely eliminated, and the energy represented by the heat and pressure of the digester will be utilized for separating the cellulose fibers.

A further object of my invention is to provide a process whereby the cellulose so separated will be resolved almost instantly into a loose mass of fibers which will require little if any further treatment, and which will be longer and stronger, due to the shorter cooking period, thus the tendency to "burn" and break down the fibers is eliminated.

A still further object of my invention is to materially shorten the cooking period and eliminate further treatment at this step in the manufacture of paper, and other cellulose products, thereby materially lowering the production costs in time, labor, machinery and power.

My invention consists in cooking the so-called paper chips in a digester of the usual type, in any of the liquors employed for this purpose, under a pressure determined by the kind of cellulose which is being "cooked" and a temperature approximately, but not lower than 100° centigrade.

The expression "paper chips" will be used throughout this specification as a convenient term to describe ligno-cellulose or vegetable fibers.

The paper chips will be cooked for a period of time sufficient to permit the liquor of the digester to penetrate the paper chips, and to dissolve the substances accompanying the cellulose, and to establish an equilibrium between the temperature and pressure within the paper chips and the liquor of the digester.

After the "cooking" has been maintained for a sufficient time, to cause the liquor in the digester to permeate the wood and soften the chips, the contents of the digester are discharged through a conduit of sufficient dimension to permit free and unimpeded passage therethrough, into an open vessel containing a liquid, preferably water.

The vessel into which the contents of the digester are discharged will contain sufficient water or other liquid to completely condense and cool the contents of the digester.

The outlet end of the discharge conduit of the digester must extend below the surface of the water or liquid in the vessel.

Owing to the pressure within the digester, the paper chips and other materials are expelled with considerable force and corresponding velocity into the receiving vessel. The discharging of the contents of the digester into the lower pressure of the liquid in the vessel causes the paper chips, in other words the cellulose fibers, to be suddenly expanded and forced apart by the reaction of the water vapor and gases to the lower pressure, thereby further disrupting and separating the cellulose fibers.

This separation is further effected by the sudden cooling which results in the material being agitated by the disturbance of the liquid in the vessel due to the rapid cooling and condensing of the gases and vapors.

In this method of discharging the digester by suddenly releasing the pressure, and discharging its contents into a cooling medium having a higher specific heat than air, the material is suddenly expanded, then contracted, and these actions are sufficiently violent to cause the separation of the solid material and this is accomplished in a much more extensive and thorough manner than is the case when the contents of the digester are discharged directly into the atmosphere, as is the present practice.

The action of the contents of the digester as it is discharged beneath the surface of the liquid much resembles, for example, the action resulting when a steam hose is plunged beneath the surface of a body of cold water, which causes a violent bubbling and agitation of the water.

While the contents of the digester are being discharged into the vessel, the cellulose fibers will be rapidly separated and cleaned, and made ready for the screens and the Fourdrinier or other machines.

The action of the contents of the digester as they are discharged beneath the surface of the water are not explosive, in the sense that the word explosive is commonly used, being prevented from such action by the resistance of the surrounding liquid.

The cellulose fibers are subjected to a sudden expansion by the water vapor and gases contained therein, and then a contraction, and almost simultaneously with these reactions the cellulose fibers are subjected to a violent pounding and agitation which results in resolving the fibrous material into a loose mass of fibers disseminated throughout the liquid of the vessel.

The cellulose fibers so treated are found to be longer and stronger than are produced by present methods, which tend to "burn" or otherwise break down the structure of the fibers.

Any practical apparatus may be used for carrying out my process; the form of which I have found most efficient will hereinafter be described in detail with reference to the accompanying drawings, in which;

Fig. 1 shows diagrammatically a common type of digester located above an open vessel and illustrates a vertical conduit extending downwardly beneath the surface of the liquid, and shows the means provided for supplying cold liquid to the vessel and the spillway provided for carrying the separated and cleaned cellulose fibers away; and Fig. 2 shows diagrammatically a digester arranged on the same level as the open vessel and discharging through a horizontal conduit in the side of the vessel, and means for supplying cold liquid at the discharge end of the vessel.

My preferred apparatus comprises a digester of usual type comprising a cylindrical tank $a$ adapted to be closed at the top, and provided with a funnel-like bottom $b$ from which a conduit $c$ of substantial diameter leads downward into an open receiving vessel $d$. A gate valve $e$ is provided in the discharge conduit $c$ for controlling the discharge from the digester, and is of the same diameter when opened as that of the conduit, so as to provide unimpeded passage of the contents of the digester to the conduit.

A check valve $g$ is located in the conduit $c$ to prevent backflow from the vessel to the digester, should a vacuum form in the digester, after the contents are discharged therefrom.

A steam inlet $f$ may be provided near the top of the digester if desirable for forcing the contents of the digester out under pressure.

The open vessel $d$ is of sufficient size so that when it is normally filled with water to about two-thirds of its capacity, the vessel will overflow when the contents of the digester and the cold water are being discharged into the vessel, over a spillway $h$, and will thus be carried to the screens, and to the further steps in the process of manufacturing paper or other cellulose products from cellulose fibers.

I have found that the best results are obtained by extending the conduit $c$ beneath the surface of the water of the vessel about one-half the normal depth of the water contained therein.

The proper circulation of the cold water and of the discharged contents of the digester I consider important, in that without sufficient circulation within the vessel, the temperature of the water might not be maintained sufficiently low to condense the water vapor and gases of the contents of the digester as they are discharged into the vessel. For this purpose I believe it convenient to provide a spillway $h$ which will carry away the cellulose fibers and the liquor of the digester nearly as fast as it is discharged from the digester.

For supplying the relatively colder liquid, preferably water to the vessel, I provide a horizontal pipe $m$ of substantial diameter controlled by a valve $i$ which extends over the vessel and from which two downwardly extending discharge pipes $n$ and $o$ are provided on opposite sides of the conduit, and slightly converge towards the end of the conduit, as best shown in Fig. 1.

By this means I provide a constant supply of cold water adjacent the discharge end of the conduit of the digester, which not only tends to maintain the liquid of the vessel at the point of discharge from the digester, at the desired temperature, but also provides additional agitation of the cellulose fibers as they are discharged from the digester, and further accelerates the circulation in the vessel.

By placing the spillway $h$ of the vessel below the normal level of the liquid of the vessel, I also utilize the well known action of convection currents, since the contents of the digester will have a higher temperature, and will tend to rise to the top of the liquid of the vessel and therefore tend to carry the separated fibers to the top of the vessel and thence over the spillway or other means for carrying off the separated fibers.

Referring now to Fig. 2, I provide another means of introducing the conduit $c'$ into an open vessel $d'$ which will be adapted to be used with my process when the digester and the receiving vessel $c'$ are substantially on the same level.

In this figure, I show the conduit $c'$ discharging through the side $p$ of the vessel $c'$, and the supply of cold water provided by means of a supply pipe $q$ are arranged above the conduit and supplying cold water near the discharge end of the conduit $c'$, and in the vessel, I provide a baffle $r$ to prevent the contents of the vessel from forming a pocket below the spillway $h'$. In this construction, I provide the usual valves similar to those shown in Fig. 1.

I claim:

1. The method of freeing the cellulose fibers of vegetable material consisting in cooking the said material in a closed container, then releasing the contents of the container through a conduit into a vessel of suitable liquid carrying substantially lower temperature and pressure than the said container, with the mouth of the conduit located a substantial distance below the surface of the liquid, whereby to induce a reaction in the mass of material emitted by said conduit tending to disrupt such material and to separate the cellulose fibers thereof.

2. The method of freeing the cellulose fibers of vegetable materials consisting in cooking the said material in a closed container then releasing the contents of the container, through a conduit into a vessel of suitable liquid carrying substantially lower temperature and pressure than the said container maintaining the said lower temperature of the liquid, with the mouth of the conduit located a substantial distance below the surface of the liquid, whereby to induce a reaction in the mass of material emitted by said conduit tending to disrupt such material and to separate the cellulose fibers thereof.

3. The method of freeing the cellulose fibers of vegetable materials consisting in cooking the said material in a closed container, then releasing the contents of the container, through a conduit into a vessel of suitable liquid carrying substantially lower temperature and pressure than the said container, with the conduit arranged perpendicular to the surface of the liquid, the mouth of the conduit located a substantial distance below said surface, whereby to induce a reaction in the mass of material emitted by said conduit tending to disrupt such material and to separate the cellulose fibers thereof.

4. The method of freeing the cellulose fibers of vegetable materials consisting in cooking the said material in a closed container then releasing the contents of the container, through a conduit into a vessel of suitable liquid carrying substantially lower temperature and pressure than the said container, with the mouth of the conduit located a substantial distance below the surface of the liquid, agitating the liquid adjacent the mouth of the conduit, whereby to induce a reaction in the mass of material emitted by said conduit tending to disrupt such material and to separate the cellulose fibers thereof.

5. The method of freeing the cellulose fibers of vegetable materials consisting in cooking the said material in a closed container, then releasing the contents of the container, through a conduit into a vessel of suitable liquid carrying substantially lower temperature and pressure than the said container maintaining the said lower temperature of the liquid, with the mouth of the conduit located a substantial distance below the surface of the liquid, agitating the liquid adjacent the mouth of the conduit, whereby to induce a reaction in the mass of material emitted by said conduit tending to disrupt such material and to separate the cellulose fibers thereof.

6. The method of freeing the cellulose fibers of vegetable materials consisting in cooking the said material in a closed container, then releasing the contents of the container, through a conduit into a vessel of suitable liquid carrying substantially lower temperature and pressure than the said container, maintaining the said lower temperature of the liquid, with the conduit arranged perpendicular to the surface of the liquid, the mouth of the conduit located a substantial distance below said surface, agitating the liquid adjacent the mouth of the conduit, whereby to induce a reaction in the mass of material emitted by said conduit tending to disrupt such material and to separate the cellulose fibers thereof.

7. The method of freeing the cellulose fibers of vegetable materials consisting in cooking the said material in a closed container and in a chemical solution tending to free the cellulose from the accompanying materials, then releasing the contents of the container, through a conduit into a vessel of suitable liquid carrying substantially lower temperature and pressure than the said container, with the mouth of the conduit located a substantial distance below the surface of the liquid, whereby to induce a reaction in the mass of material emitted by said conduit tending to disrupt such material and to separate the cellulose fibers thereof.

8. The method of freeing the cellulose fibers of vegetable materials consisting in cooking the said material in a closed container and in a chemical solution tending to free the cellulose from the accompanying materials, then releasing the contents of the container through a conduit into a vessel of suitable liquid carrying substantially lower temperature and pressure than the said container, with the mouth of the conduit located a substantial distance below the surface of the liquid, agitating the liquid adjacent the mouth of the conduit, whereby to induce a reaction in the mass of material emitted by said conduit tending to disrupt such material and to separate the cellulose fibers thereof.

9. The method of freeing the cellulose fibers of vegetable materials consisting in cooking the said material in a closed container and in a chemical solution tending to free the cellulose from the accompanying materials, then releasing the contents of the container, through a conduit into a vessel of suitable liquid carrying substantially lower temperature and pressure than the said container, with the conduit arranged perpendicular to the surface of the liquid, the mouth of the conduit located a substantial distance below said surface, whereby to induce a reaction in the mass of material emitted by said conduit tending to disrupt such material and to separate the cellulose fibers thereof.

10. The method of freeing the cellulose fibers of vegetable materials consisting in cooking the said material in a closed container and in a chemical solution tending to free the cellulose from the accompanying materials, then releasing the contents of the container through a conduit into a vessel of suitable liquid carrying substantially lower temperature and pressure than the said container maintaining the said lower temperature of the liquid, with the mouth of the conduit located a substantial distance below the surface of the liquid, agitating the liquid adjacent the mouth of the conduit, whereby to induce a reaction in the mass of material emitted by said conduit tending to disrupt such material and to separate the cellulose fibers thereof.

11. The method of freeing the cellulose fibers of vegetable materials consisting in cooking the said material in a closed container and in a chemical solution tending to free the cellulose from the accompanying materials, then releasing the contents of the container, through a conduit into a vessel of suitable liquid carrying substantially lower temperature and pressure than the said container, maintaining the said lower temperature of the liquid, with the conduit arranged perpendicular to the surface of the liquid, the mouth of the conduit located a substantial distance below said surface, agitating the liquid adjacent the mouth of the conduit, whereby to induce a reaction in the mass of material emitted by said conduit tending to disrupt such material and to separate the cellulose fibers thereof.

WILLIAM I. CHIDESTER.